US006833211B1

United States Patent
Yang

(10) Patent No.: US 6,833,211 B1
(45) Date of Patent: Dec. 21, 2004

(54) FUEL CELL STACK HAVING A REDUCED VOLUME

(75) Inventor: Deliang Yang, Torrance, CA (US)

(73) Assignee: UTC Fuel Cells, LLC, South Windsor, CT (US)

(*) Notice: Subject to any disclaimer, the term of this patent is extended or adjusted under 35 U.S.C. 154(b) by 0 days.

(21) Appl. No.: 10/689,238

(22) Filed: Oct. 20, 2003

(51) Int. Cl.[7] ........................... H01M 8/04; H01M 8/02
(52) U.S. Cl. ........................ 429/26; 429/12; 429/34; 429/39
(58) Field of Search ........................ 429/26, 34, 39, 429/12

(56) References Cited

U.S. PATENT DOCUMENTS 5,503,944 A  4/1996  Meyer et al.

6,521,367 B2  2/2003  Reiser

Primary Examiner—John S. Maples
(74) Attorney, Agent, or Firm—Malcolm J. Chisholm, Jr.

(57) ABSTRACT

A reduced volume fuel cell stack (10) includes a plurality of thin fuel cells (46, 48, 50, 52, 54) and a plurality of thick fuel cells (56, 58). The thin fuel cells include water management channels (62A, 62B, 62C, 62D) and the thick fuel cells include cooling channels (76A, 76B, 76C, 76D). At least two thin fuel cells (48, 50) are secured adjacent each other and adjacent each thick fuel cell (56, 58) within the stack (10). The water management channels (62A, 62B, 62C, 62D) have a depth that is at least four times less than a depth of the cooling channels (76A, 76B, 76C, 76D) so that volume, weight and water content of the stack (10) are reduced.

4 Claims, 3 Drawing Sheets

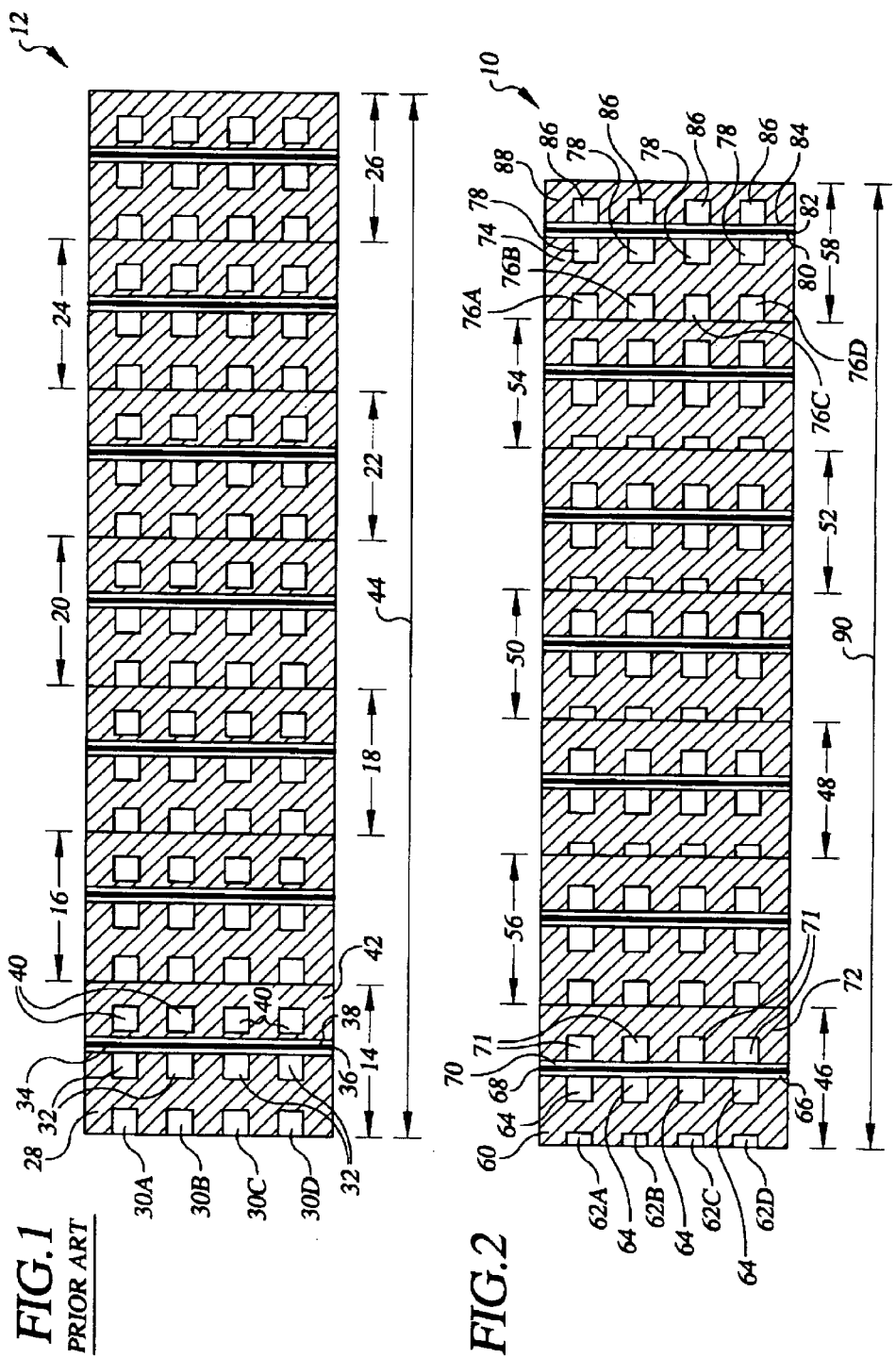

No. of Thin Fuel Cells for Each Thick Fuel Cell

No. of Thin Fuel Cells for Each Thick Fuel Cell

FUEL CELL STACK HAVING A REDUCED VOLUME

TECHNICAL FIELD

The present invention relates to fuel cell stacks that are suited for usage in transportation vehicles, portable power plants, or as stationary power plants, and the invention especially relates to a fuel cell stack having thin and thick fuel cells arranged so that between two and five thin fuel cells are secured adjacent each other and adjacent each thick fuel cell to reduce an overall volume of the stack.

BACKGROUND ART

Fuel cell power plants are well known and are commonly used to produce electrical current from hydrogen containing reducing fluid fuel and oxygen containing oxidant reactant streams to power electrical apparatus such as power plants and transportation vehicles. In fuel cell power plants of the prior art, it is known that water management and cooling tasks are frequently managed by a cooling system. As disclosed in U.S. Pat. No. 5,503,944 that issued to Meyer et al. on Apr. 2, 1996, and in U.S. Pat. No. 6,521,367 that issued on Feb. 18, 2003 to Reiser, which patents are owned by the owner of all rights in the present invention, such cooling systems typically include a porous water transport plate defining channels to direct water from and through the fuel cell.

Product water generated during operation of the fuel cell is frequently directed as liquid water into the porous water transport plates and out of the fuel cell within the channels of the plates, as well as by being entrained as water droplets and water vapor within exhaust streams of fuel cell reactants within reactant flow fields that are also often partially defined within the water transport plates. Additionally, cooling water is directed to flow through the channels of the water transport plates through the fuel cells to remove heat generated during operation of the fuel cells. If the water transport plates are porous, such cooling water also moves through the water transport plates into adjacent reactant flow fields to humidify reactant streams and prevent dry-out of proton exchange membrane ("PEM") electrolytes.

Consequently, it can be seen that known porous water transport plates facilitate both water management and cooling functions. Water management functions include humidification of reactant streams and removal of liquid condensates and fuel cell product water. Cooling functions include removing heat generated during operation of fuel cells. It is also well known that a plurality of fuel cells are typically disposed cooperatively to form a fuel cell stack including manifolds and headers to deliver and remove reactant and coolant streams. In manufacture of such fuel cell stacks, it has become common for purposes of manufacturing efficiency to utilize a water transport plate defining channels for directing water from and through the fuel cells of the stack that accomplish both the water management and cooling tasks.

However, as such fuel cell stacks become useful in powering transportation vehicles, such as busses, trucks automobiles, etc., it is imperative that the fuel cell stacks occupy as small a volume as possible and have the lowest possible weight. Additionally, such transportation vehicles are typically exposed to sub-freezing ambient conditions below the freezing temperature of water. Therefore to enhance efficiency of the stack upon start up in such sub-freezing conditions, it is necessary that the fuel cell stack contain the least possible volume of water.

Consequently, there is a need for a fuel cell stack with the least possible overall volume and weight, and with the least possible volume of water.

DISCLOSURE OF INVENTION

The invention is a fuel cell stack for generating electrical current that has a reduced volume compared to known fuel cell stacks. The fuel cell stack includes a plurality of thin fuel cells and a plurality of thick fuel cells. The thin fuel cells include a water management water transport plate in fluid communication with a reactant flow field of the thin fuel cell. The water management water transport plate defines water management channels for directing flow of water from and through the thin fuel cell to facilitate water management functions of the fuel cell stack including humidification of reactant streams and removal of condensate and fuel cell product water.

The thick fuel cells are cooperatively disposed with the thin fuel cells to form the fuel cell stack along with known manifolds and headers, etc. Each thick fuel cell includes a combined water management and coolant water transport plate in fluid communication with a reactant flow field of the thick fuel cell. The combined water management and coolant water transport plate defines cooling channels for directing flow of water from and through the thick fuel cell. The thick fuel cells are secured within the fuel cell stack so that at least two thin fuel cells are secured adjacent each other and adjacent each thick fuel cell. Also, the water management channels defined within the water management water transport plates of the thin fuel cells have a depth parallel to a longitudinal axis of the stack that is at least four times less than a depth of the cooling channels defined within the combined water management and coolant water transport plates of the thick fuel cells. The longitudinal axis of the fuel cell stack runs through the stack and is also a shortest distance between non-adjacent fuel cells of the stack.

Water management functions of humidification and removal of condensed water from reactant streams and removal of fuel cell product water require only a small fraction of the water flow through each fuel cell that is required for cooling a fuel cell. However, cooling can be effectively achieved for between about two to five fuel cells by passing an adequate volume of cooling water through the combined water management and coolant water transport plate of one thick fuel cell.

Therefore, by having one thick fuel cell for every two to five thin fuel cells, the thinner water management water transport plates of the thin fuel cells provide for a significant reduction in both an overall volume and weight of the fuel cell stack and also in an overall amount of water resident within the fuel cell stack during operation of the stack. Decreasing the amount of water in the fuel cell stack facilitates start up of the fuel cell stack in sub-freezing ambient conditions.

Accordingly, it is a general purpose of the present invention to provide a fuel cell stack having a reduced volume that overcomes deficiencies of the prior art.

It is a more specific purpose to provide a fuel cell stack that reduces an overall volume and weight of the fuel cell stack.

It is yet another, purpose to provide a fuel cell stack that has the least possible volume of water.

These and other purposes and advantages of the present fuel cell stack having a reduced volume will become more readily apparent when the following description is read in conjunction with the accompanying drawings.

BRIEF DESCRIPTION OF THE DRAWINGS

FIG. 1 is a schematic, fragmentary representation of a prior art fuel cell stack.

FIG. 2 is a schematic, fragmentary representation of a preferred embodiment of a fuel cell stack having a reduced volume constructed in accordance with the present invention.

DESCRIPTION OF THE PREFERRED EMBODIMENTS

Figure 3:
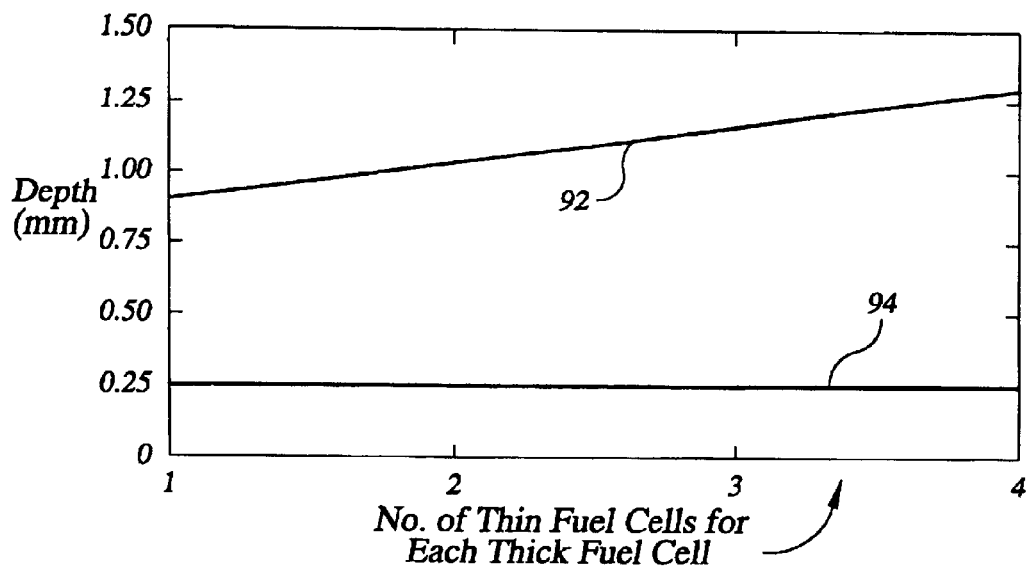
FIG. 3 is a graph showing depth of coolant channels defined within a water management water transport plate and a combined water management and a coolant water transport plate of a fuel cell stack of the present invention as a function of a number of thin fuel cells for each thick fuel cell.

Referring to the drawings in detail, a portion of a prior art fuel cell stack 12 is shown in FIG. 1, and includes a plurality of fuel cells 14, 16, 18, 20, 22, 24 and 26 cooperatively disposed adjacent each other to form the portion of the fuel cell stack 12. For purposes of clarity in describing the invention, other components of a fuel stack well known in the art such as manifolds for directing flow of reactant, exhaust, coolant streams, pressure plates, electrical current conductors, etc. are not shown in FIGS. 1 and 2. Each prior art fuel cell 14, 16, 18, 20, 22, 24, 26 includes common components, and the components of only one of the prior art fuel cells, fuel cell 14, will be described in detail.

Prior art fuel cell 14 includes a water transport plate 28 that defines a plurality of water channels 30A, 30B, 30C, 30D for directing a stream of water through the fuel cell 14. The water transport plate 28 may also define a first reactant flow field 32 consisting of channels or voids defined within the plate 28. The first reactant flow field 32 is positioned adjacent a first electrode 34 which is secured to an electrolyte 36. A second electrode 38 is secured to an opposed surface of the electrolyte 36, and a second reactant flow field 40 is defined within a second reactant flow field plate 42. As is well known, a first reactant such as hydrogen gas would be directed to flow through the first flow field 32 while a second reactant such as oxygen within air would be directed to flow through the second flow field 40 thereby generating electrical current in a manner well known in the art.

The prior art fuel cells 14, 16, 18, 20, 22, 24 and 26 are cooperatively disposed to form the fuel cell stack 12 which has a specific length represented by the line designated by reference numeral 44. As is apparent from FIG. 1, the length of the prior art fuel cell stack 12 is a function of many variables including a depth of each of the water channels 30A, 30B, 30C, 30D in fuel cell 14 and similar water channels in prior art fuel cells 16, 18, 20, 20, 24 and 26. For purposes herein, the "depth" of a channel in the prior art fuel cell stack 12 or in a fuel cell stack 10 of the present invention shown in FIG. 2 is defined to be a linear dimension that is parallel to a longitudinal axis of the fuel cell stack, wherein the "longitudinal axis" is a shortest distance between non-adjacent cells of the stack, such as parallel to the length line 44 of FIG. 1.

A fuel cell stack having a reduced volume constructed in accordance with the present invention is shown schematically in FIG. 2, and is generally designated by reference numeral 10. The fuel cell stack 10 includes a plurality of thin fuel cells 46, 48, 50, 52, 54, and a plurality of thick fuel cells 56, 58. For purposes of efficiency, only one thin fuel cell 46 will be described in detail, while it is noted that the remaining thin fuel cells 48, 50, 52, and 54 have virtually identical components. Thin fuel cell 46 includes a water management water transport plate 60 that defines a plurality of water management channels 62A, 62B, 62C, 62D for directing a flow of water from and through the thin fuel cell 46. The water management water transport plate 60 also defines a first reactant flow field 64 in fluid communication with the plate 60 and secured adjacent a first electrode 66 which, as is well known, is secured adjacent an electrolyte 68. A second electrode 70 is secured adjacent the electrolyte 68 to form a membrane electrode assembly well known in the art, which may also include substrate layers and/or diffusion layers (not shown). A second reactant flow field 71 is defined within a second reactant flow field plate 72 secured adjacent the second electrode 70, as with the described prior art fuel cell 14.

The thick fuel cells 56, 58 each include the same components, so only thick fuel cell 58 will be described in detail. Thick fuel cell 58 includes a combined water management and coolant water transport plate 74 that defines a plurality of cooling channels 76A, 76B, 76D and 76D. The combined water management and coolant water transport plate 74 also may define a first reactant flow field 78 in fluid communication with the plate 74 and secured adjacent a first electrode 80 which in turn is adjacent an electrolyte 82 and a second electrode 84, in a well known manner. A second reactant flow field 86 is defined within a second reactant flow field plate 88 to direct a second reactant to flow adjacent to the second electrode 84.

The fuel cell stack having a reduced volume 10 of the present invention has a specific length represented by the line designated by reference numeral 90. It is stressed that the fuel cell stacks 12 and 10 are not shown in accurate scale in FIGS. 1 and 2, but instead are drawn to emphasize the significant impact of use of the described thin and thick fuel cells upon the overall length of the reduced volume fuel cell stack 10. In particular, the water management channels 62A, 62B, 62C, 62D defined within the water management water transport plate 60 of the thin fuel cell 46 have a depth that is at least four times less than a depth of the cooling channels 76A, 76B, 76C, 76D defined within the combined water management and coolant water transport plate 74 of the thick fuel cell 58.

Additionally, the thick fuel cells 56, 58 are secured within the fuel cell stack 10 so that at least two thin fuel cells 46, 48, 50, 52, 54 are secured adjacent each other and adjacent each thick fuel cell 56, 58. By the phrase "thin fuel cells secured adjacent each other and adjacent each thick fuel cell 56, 58", it is meant that at least two thin fuel cells are secured next to each other and that at least two adjacent thin fuel cells are secured between the thick fuel cells 56, 58. For example and as shown in FIG. 2, four thin fuel cells 48, 50, 52 and 54 are shown as being "secured adjacent each other and adjacent each thick fuel cell" 56, 58. The thick fuel cells 56, 58 have the same four thin fuel cells secured adjacent to each thick fuel cell 56, 58.

In a preferred embodiment of a thin fuel cell, the depth of the water management channels such as channels 62A, 62B, 62C, 62D of the water management water transport plate 60 of the thin fuel cell 46 is between about 0.10 millimeters ("mm") and about 0.25 mm. Also in a preferred embodiment of a thick fuel cell, the depth of the cooling channels such as 76A, 76B, 76C, 76D of the combined water management and coolant water transport plate 74 of the thick fuel cell 58 is between about 0.5 mm and about 1.5 mm. (For purposes herein, the word "about" means plus or minus ten percent.) For a fuel cell stack having such preferred embodiments of the thick and thin fuels cells, the fuel cells would be selected so that the water management channels of the thin fuel cells would have a depth within the range recited above that is also at least four times less than a depth within the range recited above of cooling channels of the thick fuel cell. One skilled in the art would understand that a fuel cell stack appropriate for powering a transportation vehicle would have many more fuel cells stacked cooperatively together in a functioning stack than the seven fuel cells shown in FIGS. 1 and 2, such as in excess of one-hundred to two-hundred separate cells consisting of thin and thick fuel cells disposed cooperatively in the described proportions.

It has been determined for a PEM fuel cell having an active area of four-hundred (400) square centimeters and designed to operate at one amp per square centimeter, that a flow rate of about three-hundred (300) cubic centimeters per minute ("ccm/cell") of water is required to properly cool the cell. However, the water management functions of providing for adequate humidification of the PEM and fuel cell reactants flowing through the cell as well as removal of water condensate from the reactant streams and removal of fuel cell product water for the same 400 square centimeter fuel cell may be satisfied by a water flow rate through porous water transport plates within the cell of less than five (5) ccm/cell. Consequently, the water management requirements of the described thin fuel cells 46, 48, 50, 52 and 54 may be readily satisfied by water management channels 62A, 62B, 62C, 62D of the thin fuel cell 46 and corresponding water management channels of thin fuel cells 48, 50, 52, and 54 that have substantially less depth than the cooling channels 76A, 76B, 76C, 76D of the thick fuel cell 58.

Figure 4:
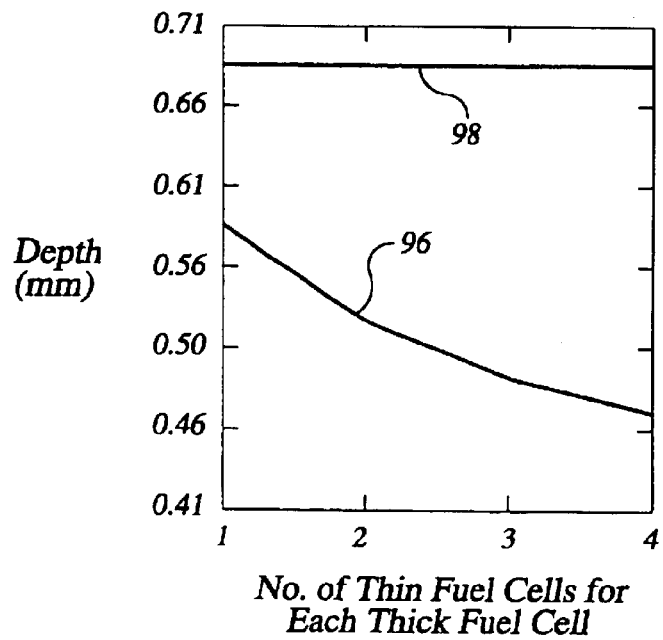
FIG. 4 is a graph showing an average depth of both cooling channels within a combined water management and coolant water transport plate and also of water management channels within a water management water transport plate of a fuel cell stack of the present invention as a function of a number of thin fuel cells for each thick fuel cell.
Figure 5:
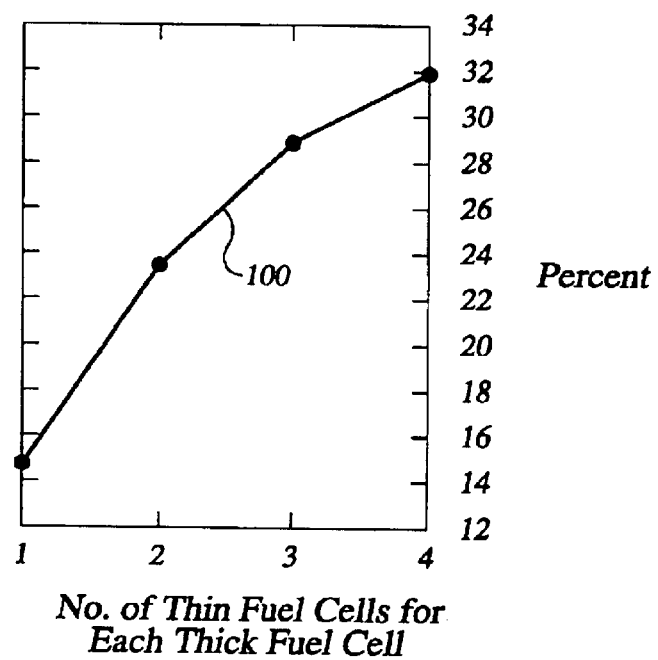
FIG. 5 is a graph, showing a reduction in average depth of both cooling channels within a combined water management and coolant water transport plate and also of water management channels within a water management water transport plate of a fuel cell stack of the present invention as a percentage of a depth of channels of only thick fuel cells with no thin fuel cells as a function of a number of thin fuel cells for each thick fuel cell.

Effects of varying proportions of thin fuel cells to thick fuel cells and required depths of cooling channels depending upon a number of thin fuel cells for each thick fuel cell are summarized in FIGS. 3–5. FIG. 3 shows a required depth of cooling channels in thick fuel cells at line 92 where a depth of water management channels in thin fuel cells is about 10 thousandths of an inch ("mils") or 0.25 mm, as shown in line 94. For the data plotted in FIG. 3, the exemplary flow rate was about 22 pounds of water per hour per cell, or 166 ccm/cell per hour, and a pressure drop of 10 inches of water or 2.6 kilo Pascals ("kPa") was assumed between water entering and exiting the fuel cells.

FIG. 4 shows an average depth at line 96 of the combined cooling channels and water management channels as a function of a number of thin fuel cells for each thick fuel cell. Line 98 in FIG. 4 shows the depth of a prior art combined coolant and water management channel of about 27 mils or 0.69 mm. Such a depth of 27 mils or 0.69 mm would be appropriate for the water channels 30A, 30B, 30C, 30D of the prior art fuel cell 14 that performed both cooling and water management functions for the cell 14. The difference between line 98 and line 96 is the reduction in thickness per cell as a result of the present invention. FIG. 5 shows a reduction in average depth of the water management and fuel channels of the fuel cell stack 10 of the present invention as a percentage at line 100 of a depth of channels of only thick fuel cells having water channels of 27 mils or 0.69 mm, with no thin fuel cells, as a function of a number of thin fuel cells for each thick fuel cell.

As is readily apparent, the length 44 of the prior art fuel cell stack 12 having seven fuel cells is considerably longer than the length 90 of the fuel cell stack having a reduced volume 10 of the present invention which also has seven fuel cells. By utilizing thin fuel cells 48, 50, 52 and 54 secured adjacent each other and between thick fuel cells 56, 68, the fuel cell stack 10 of the present invention achieves a substantial savings in volume, weight and an amount of water within the stack 10. Depending upon requirements of a particular cell stack, such as power levels, thin fuel cells may be secured adjacent each other and between each large fuel cell from between two thin fuel cells per thick fuel cell and up to ten thin fuel cells for each thick fuel cell. In certain rare circumstances, it may also be appropriate to have only one thin fuel cell for every thick fuel cell (not shown) in order to achieve a modest reduction in volume of the cell stack. For such a circumstance, the fuel cell stack is characterized as having at least one thin fuel cell secured adjacent each thick fuel cell.

All of the aforementioned U.S. patents are incorporated herein by reference.

While the present invention has been disclosed with respect to the described and illustrated embodiments of the fuel cell stack having a reduced volume 10, it is to be understood that the invention is not to be limited to those embodiments. Accordingly, reference should be made primarily to the following claims rather than the foregoing description to determine the scope of the invention.

What is claimed is:

1. A fuel cell stack (10) for generating electrical current, comprising:

a. a plurality of thin fuel cells (46, 48, 50, 52, 54), wherein each thin fuel cell (46) includes a water management water transport plate (60) that defines water management channels (62A, 62B, 62C, 62D) for directing flow of water from and through the thin fuel cell (46);

b. a plurality of thick fuel cells (56, 58) cooperatively disposed with the thin fuel cells (46, 48, 50, 52, 54) to form the fuel cell stack (10), wherein each thick fuel cell (58) includes a combined water management and coolant water transport plate (74) that defines cooling channels (76A, 76B, 76C, 76D) for directing flow of water from and through the thick fuel cell (58); and, c. wherein the thick fuel cells (56, 58) are secured within the fuel cell stack (10) so that at least two thin fuel cells (48, 50, 52, 54) are secured adjacent each other and adjacent each thick fuel cell (56, 58), and wherein the water management channels (62A, 62B, 62C, 62D) have a depth parallel to a longitudinal axis of the stack extending a shortest distance between non-adjacent fuel cells (46, 48) of the stack (10) that is at least four times less than a depth of the cooling channels (76A, 76B, 76C, 76D).

2. The fuel cell stack (10) of claim 1, wherein between two and five thin fuel cells (46, 48, 50, 52, 54) are secured adjacent each other and adjacent each thick fuel cell (56, 58).

3. The fuel cell stack (10) of claim 1, wherein the water management channels (62A, 62B, 62C, 62D) of the water management water transport plates (60) of the thin fuel cells (46, 48, 50, 52, 54) have a depth of between about 0.10 millimeters and about 0.25 millimeters, and the cooling channels (76A, 76B, 76C, 76D) of the combined water management and coolant water transport plates (74) of the thick fuel cells (56, 58) have a depth of between about 0.5 millimeters and about 1.5 millimeters.

4. A fuel cell stack (10) for generating electrical current, comprising:

a. a plurality of thin fuel cells (46, 48, 50, 52, 54), wherein each thin fuel cell (46) includes a water management water transport plate (60) that defines water management channels (62A, 62B, 62C, 62D) for directing flow of water from and through the thin fuel cell (46);

b. a plurality of thick fuel cells (56, 58) cooperatively disposed with the thin fuel cells (46, 48, 50, 52, 54) to form the fuel cell stack (10), wherein each thick fuel cell (58) includes a combined water management and coolant water transport plate (74) that defines cooling channels (76A, 76B, 76C, 76D) for directing flow of water from and through the thick fuel cell (58); and, c. wherein the thick fuel cells (56, 58) are secured within the fuel cell stack (10) so that at least one thin fuel cell (48, 50, 52, 54) is secured adjacent each thick fuel cell (56, 58), and wherein the water management channels (62A, 62B, 62C, 62D) have a depth parallel to a longitudinal axis of the stack extending a shortest distance between non-adjacent fuel cells (46, 48) of the stack (10) that is at least four times less than a depth of the cooling channels (76A, 76B, 76C, 76D).

* * * * *